United States Patent

[11] 3,633,422

| [72] | Inventor | Herman R. Grieshaber |
| | | 621 Exmoor Road, Kenilworth, Ill. 60043 |
| [21] | Appl. No. | 826,989 |
| [22] | Filed | May 22, 1969 |
| [45] | Patented | Jan. 11, 1972 |

[54] URINOMETER CONSTRUCTION
1 Claim, 8 Drawing Figs.

[52] U.S. Cl. .................................................. 73/219
[51] Int. Cl. ................................................... F01f 11/10
[50] Field of Search........................................... 73/219,
424; 128/2, 275, 295

[56] References Cited
UNITED STATES PATENTS

| 3,511,085 | 5/1970 | Pasner et al. ................ | 73/80 |
| 223,034 | 12/1879 | Douglass ....................... | 73/424 |
| 2,792,836 | 5/1957 | Reynolds et al. .............. | 73/424 X |
| 3,194,069 | 7/1965 | Scott ............................ | 73/219 |

*Primary Examiner*—Richard C. Queisser
*Assistant Examiner*—Ellis J. Koch
*Attorney*—Pendleton, Neuman, Williams & Anderson ABSTRACT: A urinometer employing a compartmented receptacle, a rotatable urine-dispensing pan having a discharge spout, and a transparent detachable cover are maintained in assembled relation by means of a resilient plastic band having end portions under tension. A rotatable drive motor supportable on the cover and detachably connected thereto has a drive shaft which penetrates the cover and engages the pan so as to rotatably position the same while in an assembled condition, thereby enabling the pan spout to be disposed over a desired receptacle compartment prior to urinometer use.

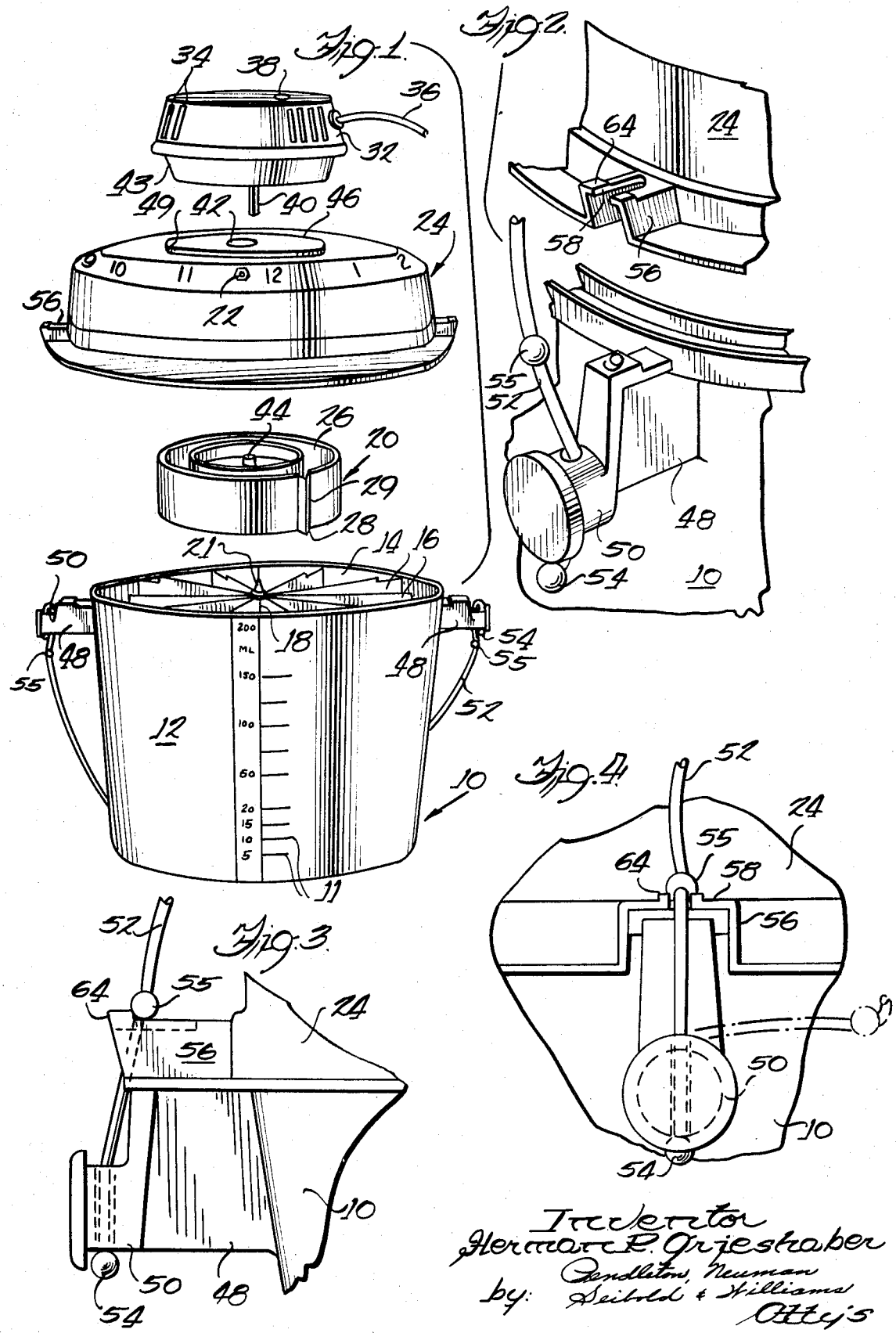

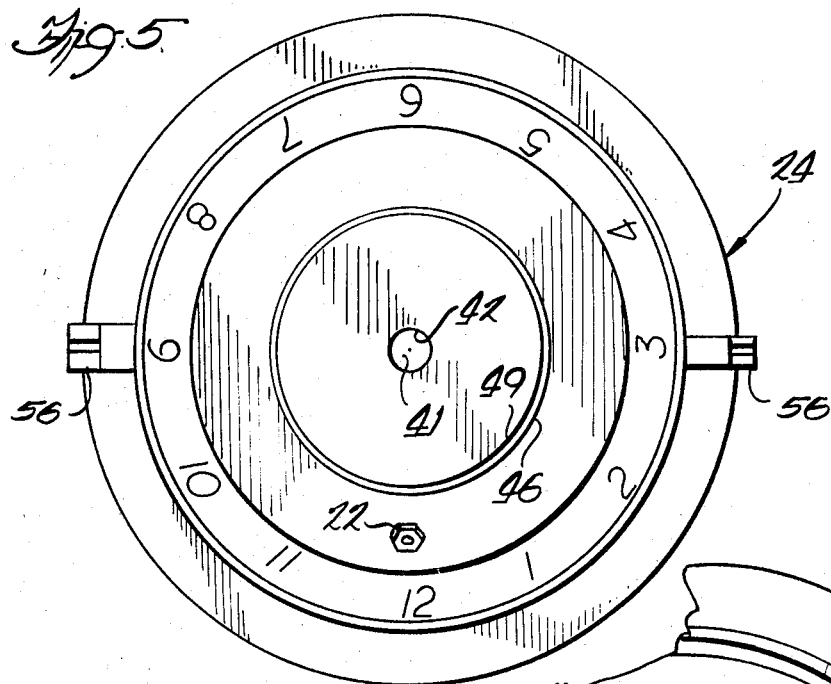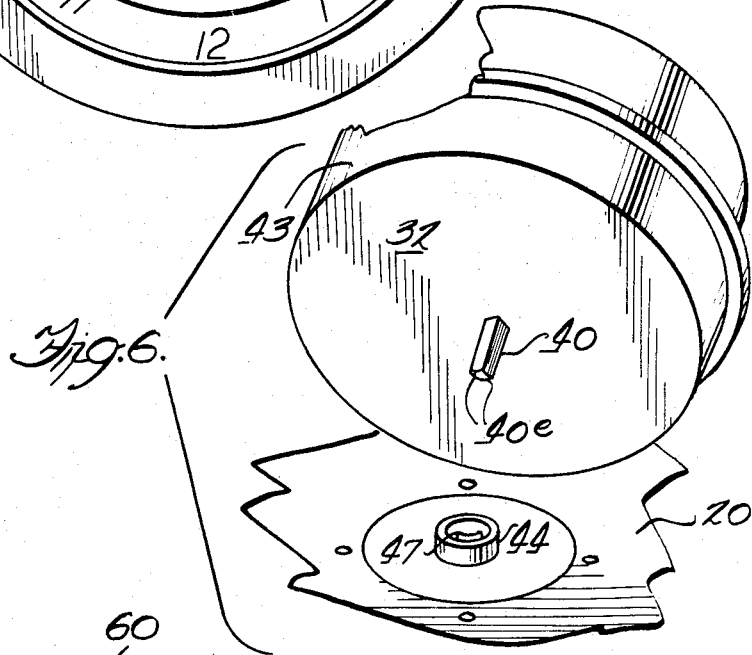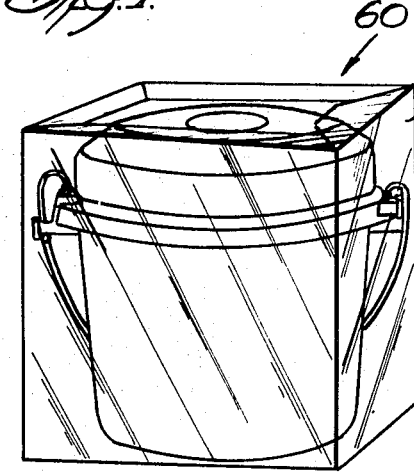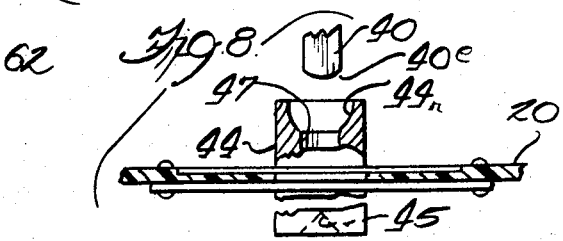

URINOMETER CONSTRUCTION

BACKGROUND OF THE INVENTION

This invention relates to a urinometer construction, and more particularly to a construction which assures optimum cleanliness and efficiency in the normal course of use.

The urinometer hereinafter described is an improvement over that disclosed in Scott U.S. Pat. No. 3,194,069 which issued July 13, 1965. The Scott urinometer comprises a compartmented receptacle, an overlying rotatable urine-dispersing pan and an uppermost cover to which clock motor is attached in such manner so as to remain united therewith throughout normal use. As a result of such motor-cover connection the underlying urine-dispersing pan may only be desirably positioned relative to the underlying receptacle compartments with the motor-cover-pan assembly disconnected from the underlying receptacle.

Since the Scott urine-dispersing pan, as well as the pan employed in the urinometer hereinafter described, serves as a timer component by employing a pointer edge for use in conjunction with an overlying clockface formed in the transparent cover surface, the time of initial urinometer use is necessarily set in the Scott urinometer with the cover detached and in an inverted position.

Such initial "zeroing" referred to in U.S. Pat. No. 3,194,069 increases the opportunity for possible contamination of the contents of the urine receptacle which are often subsequently analyzed following collection thereof. More importantly a contaminated receptacle may also serve as a source of infection for the individual connected to the urinometer y a catheter.

In addition, the Scott urinometer construction rendered resetting of the timer element comprising the dispensing pan and disassembly of such pan for cleaning purposes distasteful tasks since urine disposed on the pan upper surface would drip therefrom onto the hands of the handler during inversion of the cover and connected pan.

Cleansing of the urinometer was also rendered difficult in view of the permanent nature of the connection between the drive motor and cover to which attached. Care had to be taken to prevent damage to the motor in the course of cleansing or sterilizing the cover after use and prior to reuse.

It is an object of this invention to provide an improved urinometer construction which utilizes a drive motor and mounting therefor which may be readily joined to a cover-dispensing pan-collecting receptacle assembly for immediately use.

It is a further object of this invention to provide a novel urinometer construction which enables a timer-clock pointer on the dispensing pan to be readily set or "zeroed" without disassembly of the cover-dispensing pan-collecting receptacle assembly, with such pan disposed in the normal position of use relative to said cover and receptacle.

It is another object of this invention to provide a urinometer construction employing a sterilized prepackaged assembly of parts made of inexpensive plastic which may be readily joined to a reusable drive motor unit and discarded after use to obviate contamination and infection.

It is a further object of this invention to provide a urinometer construction employing a novel connection between a motor drive shaft and an aligned mating opening in an underlying urine-dispensing pan which facilitates initial engagement and subsequent interlocking between the shaft and pan.

It is another object of this invention to provide an improved urinometer construction employing a novel, inexpensive locking means for securing together a disposable assembly of a cover and attached collecting receptacle.

The above and other objects of this invention will become more apparent from the following detailed discussion when read in the light of the accompanying drawings and appended claims.

DESCRIPTION OF THE DRAWINGS

FIG. 1 is an exploded view of the basic components of the urinometer made in accordance with this invention;

FIG. 2 is a fragmentary, enlarged, perspective view illustrating the novel combination lock and handle means employed in the urinometer of FIG. 1;

FIG. 3 is an enlarged, fragmentary, side elevational view illustrating the manner in which the locking means shown in FIG. 2 serves to connect the cover and underlying receptacle of the provided urinometer in assembled relationship;

FIG. 4 is a view similar to FIG. 3 taken at right angles to FIG. 3;

FIG. 5 is a top plan view of the cover member of a urinometer made in accordance with this invention;

FIG. 6 is a fragmentary perspective view illustrating the drive shaft of the motor drive unit of the provided urinometer adjacent the receiving socket disposed in the top of the urine-dispensing pan employed in the urinometer of this invention;

FIG 7 is a perspective view of a sterile package in which is disposed an assembled urine receptacle, dispensing pan and overlying cover member ready for use; and FIG. 8 is a fragmentary side elevational view, partly in section, illustrating the manner whereby the drive shaft of the drive motor of the provided urinometer may be readily connected to the receiving socket disposed in the upper portion of the urine-dispensing pan of the provided urinometer.

DESCRIPTION OF THE INVENTION

Referring now to FIG. 1, an exploded view is therein depicted of the four basic components utilized in the urinometer construction of this invention. A receptacle 10 comprises an outermost shell on which are disposed level indicia 11 comprising grooves or the like, and corresponding numbers for indicating the amount of urine which has been collected in the receptacle. The receptacle 10 is preferably composed of an inexpensive transparent plastic such as polypropylene or the like. The interior of the receptacle 10 is composed of a number of urine-receiving compartments 14 formed by radiating wall members 16 extending from a central post 18 on top of which is disposed a thrust bearing 21.

The receptacle 10 is substantially the same as that disclosed in the Scott U.S. Pat. No. 3,194,069 and may possess a central elevated bottom wall to reduce the cross-sectional area of each portion of the triangular compartments 14, defined by the vertical walls 16 and the outer shell 12, so as to provide a higher rate of urine level rise for a given volume at the beginning of the urine collection in the receptacle 10. The latter structure is clearly disclosed in column 3, lines 31–39 in FIG. 2 of the drawing of the above-mentioned Scott patent.

The primary functions of urinometers such as that disclosed in this application are well known. The rate of urine output by a patient suffering from a illness, or following surgery, is an excellent indication of the progress which the patient is making in the course of recovery. The amount of urine discharge is therefore a great importance and value to the attending physician or surgeon.

In the normal course of urinometer use, urine is passed from the bladder of the patient, through a catheter, to a drainage tube which connects with a plug 22 disposed in cover 24 illustrated in FIG. 1. Urine drops by gravity from the terminal end of the drainage tube through cover 24 into underlying dispensing pan 20 having an outer urine-receiving annulus 26, which in turn has a downwardly sloping bottom portion leading to a drainage opening or spout 28. The urine-dispensing pan is similar to that disclosed in the Scott U.S. Pat. No. 3,194,069 and similarly discharges a thin urine stream which falls by gravity into the underlying compartments 14 from the opening 28. Since upper edge portions 30 of each of the vertical walls 16 defining the collecting chambers 14 are extremely thin so as to define knifelike edges, a sharp cutoff of the falling urine stream from the opening 28 of the urine-dispensing pan 20 is assured as the rotatable dispensing pan moves from one collecting chamber to another.

Disposed in the central portion of the dispensing pan 20 is a connector 44 (see FIGS. 6 and 8) adapted to engage the conical thrust bearing 21 by means of conical socket 45 (see FIG. 8), whereby the dispensing pan may freely rotate relative to the underlying collecting receptacle 10.

The urine receptacle 10 has 12 urine-receiving chambers 14 of equal dimensions, and the dispensing pan 20 is rotatably driven by a clock motor disposed within housing 32 illustrated in FIG. 1, having venting openings 34 disposed in wall portions thereof. A cord 36 enables the motor disposed within the housing 32 to be electrically energized, and also serves to energize a pilot light 38 disposed in the housing, indicating when the urinometer is in the "on" condition. Since the motor within the housing 32 is a clock motor, drive shaft 40 will perform one complete revolution in the course of a 12-hour period. Accordingly, if the dispensing pan 20 is rotatably driven by shaft 40, it also will rotate throughout the 12-hour period, dispensing urine from the opening 28 into each of the underlying chambers 14 for 1-hour periods in the course of revolution.

In accordance with this invention it has been found to be extremely advantageous in the normal course of the urinometer use if the drive motor and housing therefor 32 could be readily disconnected from the supporting cover 24, and likewise readily connected thereto. During connection the drive shaft 40 may enter central opening 42 in the cover 24, more clearly seen in FIG. 5, and engage shaft socket portion 47 disposed in an upper cylindrical portion of connector 44, centrally disposed in the underlying urine-dispensing pan 20. FIG. 6 illustrates the drive shaft 40 extending from the motor housing 32, and the underlying drive-shaft-receiving socket portion 47 of connector 44 securely mounted to the central portion of the underlying urine-dispensing pan 20, fragmentarily illustrated. For clarity of description, cover 24 normally disposed between housing 32 and pan 20 is not illustrated in FIGS. 6 and 8.

To facilitate the initial engagement between the drive shaft 40 and the socket portion 47, lower edge portions 40e of the drive shaft 40 are rounded, as is most clearly seen in FIGS. 6 and 8, and the distal terminal portion of socket portion 47 of connector 44 is similarly rounded as at 44r. Once the terminal end of the drive shaft 40 has found the underlying central opening in the socket 47, the drive shaft 40 may be slightly rotated until the square peripheral section of such drive shaft mates with the underlying square peripheral section of the receiving socket portion 47, enabling the socket and connected pan 20 to be rotated with the rotation of the motor housing 32 and extending drive shaft 40.

In accordance with this invention, the separability of the motor housing 32 relative to the underlying cover 24 which normally supports the motor and housing in the normal course of urinometer operation, enables the dispensing pan 20 to be initially rotated by the motor housing and allows the projecting shaft 40 to rotate the underlying dispensing pan 20 whereby the drainage opening 28 will be desirably disposed over the proper underlying urine-receiving chamber 14 corresponding to the starting time. Each chamber 14 corresponds to a specific hour period indicated by the overlying hours formed on the cover 24 and more clearly seen in FIGS. 1 and 5 of the drawing. The precise time at which the urinometer is placed in operation is therefore initially set by rotating the pan 20 until the opening 28 from which the urine discharges and an elongate vertical triangular rib portion 29 disposed thereover which serves as a clock pointer-indicator, are rotatably moved into desired position by the drive shaft 40 to correspond with a time indicated by the clock face disposed on the cover 24.

Since the cover 24 is formed of transparent plastic material, the time-indicating edge 29 of the dispensing pan will be readily visible and the urinometer will be "zeroed" to correspond with the precise time that the urinometer is placed in operation, which time will be recorded. Similarly, after a period of time has expired, the nurse or other attendant will readily be informed of the time that the urinometer has been collecting urine by noting the cover clockface beneath which the time-indicating edge 29 is then later disposed.

Once the dispensing pan has been rotated into the desired starting position relative to the underlying urine receptacle 10, the motor housing 32 is urged downwardly whereby the tapering sidewall portion 43 engages inner portions of vertical recess-defining wall 49 centrally disposed in the underlying cover 24 in a frictional press fit. As is apparent from FIG. 8, the drive shaft 40 projecting from the housing 32 is able to initially rotate the underlying pan 20 because of an engagement between the shaft 40 and socket portion 47. The shaft 40 may then proceed further downwardly into connector 44 in the course of urging the motor housing 32 into a tight, relatively immovable relationship with the cover 24 in receiving recess 46, defined in part by the vertical wall 49 formed in the cover 24. Shaft 40 is of adequate length to rotate the pan 20 prior to the downward urging of housing 32, at which time shaft 40 moves downwardly into connector 44. Connector 44 may be formed integrally with the pan 20 as by molding or the like rather than comprise a separate connected piece as illustrated.

In operating assembled relationship, the motor housing 32 will be immovable relative to cover 24 while disposed in the recess 46 thereof. The dispensing pan 20 will in turn be rotatably mounted below the cover 24 on the thrust bearing 21 and over the urine-collecting receptacle 20.

FIGS. 2 through 4 illustrate in detail novel connecting means which the applicant has provided for purposes of securing the urine receptacle 10, the overlying pan 20, and the uppermost cover 24 in a state of assembled relationship. Projecting from diametrically opposed peripheral portions of the collecting receptacle 10 are lug portions 48 having projecting knob portions 50, traversed by thin, flexible end portions of plastic band 52 which is inherently possessed of resilient properties. Formed in terminal portions of band 52 are anchor spheres or enlargements 54 which enable end portions of the band 52 to serve as tensioning means for urging the overlying cover 24 of the provided urinometer into assembled relationship with an upper flange portion of the receptacle 10.

Diametrically opposed on peripheral portions of cover 24 are earlike projections 56, the inner portions of which engage lugs 48, and the outer portions of which have central slots 58 adapted to receive the thickness of the band 52. Locking spheres 55, which may be molded or otherwise formed in band 52, stretch end portions of the band 52 when engaging upper surface portions of the ears 56 as shown in FIGS. 3 and 4. After the band 52 has been inserted within the slots 58 and enlargements 55 placed over ears 56, the cover and underlying receptacle are securely assembled by virtue of the opposed connecting resilient portions of band 52 between enlargements 54 and 55. The band portion between enlargements 55 serves as a urinometer handle. A raised ledge portion 64 disposed in the upper surface of each split ear 56 serves to retain the enlargements 55 of band 52 locked in place relative to the ears 56 until the enlargements 55 are disengaged from the ears by raising and moving outwardly.

As above noted, the novel construction provided by this invention enables the drive shaft 40 projecting from the motor housing 32 to initially rotatably position the underlying dispensing pan 20 with the time-indicating pointer edge 29 in the desired position over one of the plurality of underlying urine receptacle chambers 14, representative of one of the 12 hours on a clockface. This initial zeroing or time-setting operation may be readily carried out with the cover 24, pan 20 and receptacle 10 in a state of assembly as effected by the resilient band 52 above described.

In the event that there is some necessity for interrupting the urine-collecting process, such as the collecting of a desired urine sample or emptying of the urine contents following a 12-hour period, the components of the urinometer may be readily placed in operative relationship after collection of the urine disposed in the receptacle 10 by reassembling the parts in the manner above indicated. The time-indicating pointer 29 of the dispensing pan may be readily reset without any need for inversion of the dispensing pan and cover, which would be undesirable because of urine disposed on the upper surface of the dispensing pan dripping onto the hands of the manipulator. The pan 20 may be readily put in appropriate position by merely rotating the drive shaft and motor housing 32 until the desired time is indicated by the projecting pointer 29 relative to the clockface of cover 24, after which the motor housing 32 is urged downwardly. The housing and motor then become immovable relative to the supporting cover until it is desired to disengage these two components by pulling the same apart.

The above-described assembly in which the motor housing and motor are readily disengageable as a unit from the remaining components of the provided urinometer provides an additional advantageous feature inasmuch as it renders possible the reuse of the relatively expensive drive motor unit, while the relatively cheap plastic components comprising the dispensing pan, urine receptacle and cover may be discarded after use with a patient.

It is contemplated, therefore, by means of the novel construction provided, that the cover 24, dispensing pan 20 and collection receptacle 10 illustrated in FIG. 1, be provided in a state of assembly, as by means of the connecting resilient band 52, in a sterile package such as is illustrated in FIG. 7. Package 60 enables a readily removable cover 62 to be opened and discarded. The sterile assembly may then be joined to the motor and motor housing 32 illustrated in FIG. 1 for purposes of placing the urine-dispensing pan 20 in desirable angular position, whereafter the urinometer may be placed in use, after a connection has been appropriately made by means of a drainage tube connected to the plug 22 in the cover 24 in the manner previously described.

There is no need to ever disassemble the components of the package 60 illustrated in FIG. 7 until is is desired to empty the urine contents. The absence of any need to ever detach the lower components of the urinometer substantially completely avoids any occasion for contamination of the urine contents. More importantly, the provided construction eliminates a potential source of infection whereby the patient, who would normally be in a weakened condition, is protected from an infection which could be extremely hazardous, and certainly an obstacle to the recuperative processes.

It is also contemplated by this invention to place a diaphragm 41 of plastic which may be stretchable, over the central opening 42 formed in the cover 24 as seen in FIG. 5, whereby contamination of the urine contents in the underlying receptacle and dispensing pan from the surface of the drive shaft 40 is avoided. Diaphragm 41 is peripherally sealed to the cover annulus-defining opening 42. Normally the drive motor housing and projecting shaft would be sterilized prior to new patient use by means of gas sterilization or other appropriate sterilization process which assures the avoidance of urine and patient contamination. It is also contemplated by this invention to attach the drive motor directly to the covered package 60 of FIG. 7, the only penetration of the cover 62 being made by the drainage tube when connected to plug 22. Cover 62 may have a central resilient piece for engagement with drive shaft 40.

It is seen, therefore, from the foregoing description that the provided urinometer construction, while similar in many respects to that disclosed in the Scott U.S. Pat. No. 3,194,069, is possessed of many advantages such as the absence of any need to disconnect the cover and dispensing pan from the underlying receptacle until the urine-collecting step has been completed, thereby assuring the avoidance of any urine or patient contamination. The provided construction also enables the initial zeroing of time-setting step in which the dispensing pan pointer is rotated into proper time position relative to the clockface to be effected without any disengagement of the cover from the remaining components of the urinometer.

The specific drive shaft and receiving socket constructions above described in detail facilitate the initial engagement between the drive shaft and the rotatable pan. The initial rotary positioning movement of the pan may therefore readily take place, whereafter the motor housing may be urged by a simple downward movement into the relatively immovable relationship with the supporting cover member. Since the urine receptacle, dispensing pan and cover are formed of inexpensive plastic, these items may be employed as a throwaway item, eliminating the need for costly and time-consuming sterilization operations, and at the same time assuring a sterile urinometer construction which renders infection of the patient substantially impossible.

I claim:

1. In a urinometer the combination comprising a compartmented urine receptacle having a supporting bearing means, a dispensing pan rotatably mounted over said receptacle on said bearing means and adapted to dispense urine collected in said pan sequentially into the compartments of said receptacle; cover means for said receptacle fixed in place over said receptacle and said dispensing pan; motive means having a housing movable from an upper position, in which rotatable relative to said cover means, into a lower position in which said motive means is immovable relative to said cover means; said motive means being mounted in a snugly receiving recess of said cover means when in said lower position; said motive means having a drive shaft extending through a first opening in said cover means into engagement with a second receiving opening in said dispersing pan; said dispensing pan being rotatable with said drive shaft relative to said cover means when said motive means housing is rotatable relative to said cover means in an upper position and said drive shaft is disposed in said receiving opening; wrapper means enveloping said urinometer so as to define a wrapper-enveloped sterilized unit; a portion of said wrapper means disposed over said first cover opening being stretchable whereby said drive shaft may be disposed in said receiving opening without rupturing said wrapper.

* * * * *